Nov. 9, 1965   T. H. KEYWORTH   3,216,079
CLAMP
Filed March 25, 1963
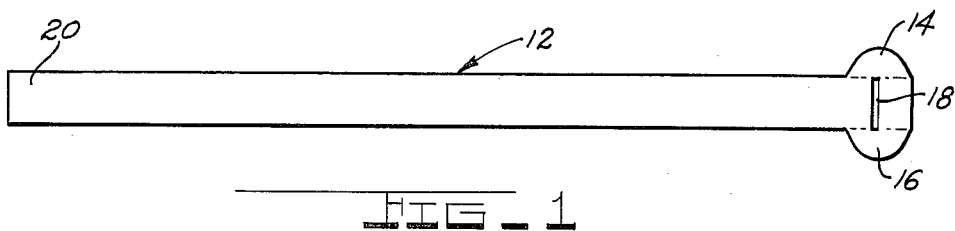
FIG_1
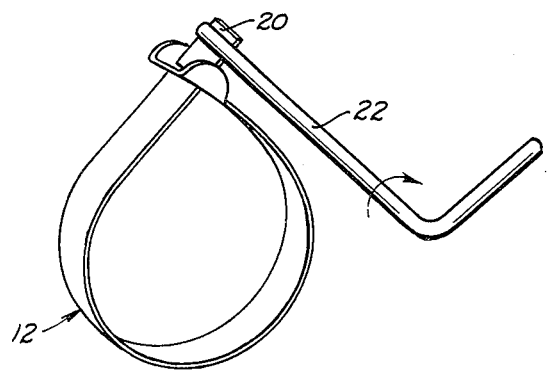
FIG_2
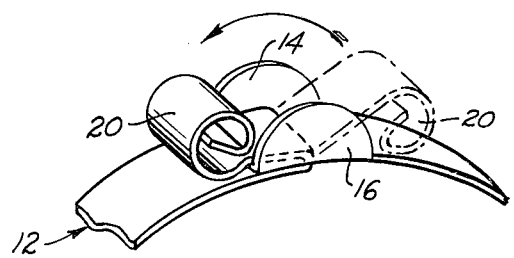
FIG_3
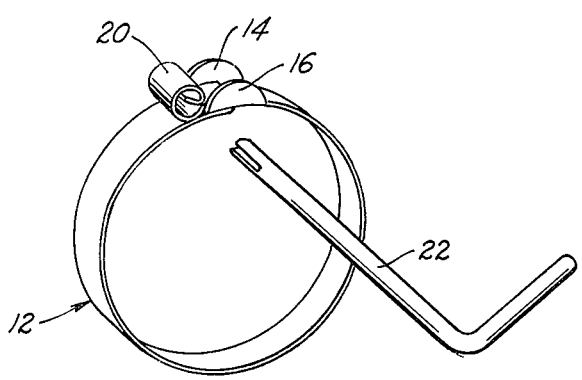
FIG_4
INVENTOR.
THOMAS H. KEYWORTH.
BY
*William N. Antonis*
ATTORNEY.

United States Patent Office 3,216,079
Patented Nov. 9, 1965

3,216,079
CLAMP
Thomas H. Keyworth, South Bend, Ind., assignor to The Bendix Corporation, South Bend, Ind., a corporation of Delaware
Filed Mar. 25, 1963, Ser. No. 267,456
1 Claim. (Cl. 24—20)

This invention relates to clamps and more particularly to a single piece band type clamp adapted for attaching a resilient tubular member to a mating telescoped member.

It is an object of this invention to provide a novel single piece band type clamp which is relatively inexpensive to fabricate.

It is another object of this invention to provide a clamp of the type described which can be easily and quickly installed in the field.

It is an important object of this invention to provide a novel single piece band type clamp which could be utilized to attach all types of resilient tubular members to mating telescoped members regardless of the diameters involved.

In other words, it is an object of this invention to provide a clamp of the type described which can be used for various diameter applications and therefore need be stocked in only one size.

More specifically, it is an object of this invention to provide a single piece band type clamp formed from a metal strip having oppositely disposed perpendicularly extending curved flanges located at one end thereof and a slot located between said flanges which is arranged to receive and permit passage therethrough of the other end of the strip to form a closed band. With such an arrangement the portion of the strip extending through the slot can then be rolled up on one side of the flange to tighten the band and can then be folded back on itself along the slot to a locked position on a substantially diametrically opposite side of the flanges to prevent loosening of the band.

The above and other objects, features, and advantages of the invention will become apparent from the following description taken in connection with the accompanying drawing which forms a part of this invention and in which:

FIGURE 1 is a plan view of my novel single piece band type clamp before the radially extending flanges are bent to a position perpendicular to the surface of the band; and FIGURES 2, 3 and 4 are dimetric views of my novel clamp as it would appear in various stages of being wrapped around a pair of telescoped members (not shown), tightened through use of a key, and locked in the desired tightened position so as to maintain said pair of telescoped members in an attached relationship.

Referring to FIGURE 1, it will be seen that my novel single piece band type clamp consists of a metal strip of material 12 having oppositely disposed curved flanges 14 and 16 located at one end thereof. These flanges are bent to a position, as shown in FIGURES 2–4, wherein they extend substantially perpendicular to the surface of the strip 12. A slot 18 is located between the flanges and is arranged for receiving and permitting passage therethrough of the other end 20 of the strip to form a closed band capable of attaching a resilient tubular member (not shown), such as a hose or boot, to a mating telescoped member (not shown).

After wrapping the strip 12 around the members (not shown) which are to be attached to each other and inserting the end 20 through the slot 18, a key 22 is used to tighten the strip of material around the members and to lock the strip in the desired tightened position.

More specifically, this is accomplished by attaching the key 22 to the end 20 of the strip 12, rotating the key in a clockwise direction, as shown in FIGURE 2, while the key bears against one side of the curved flanges 14 and 16, so that the end 20 of the strip will be wrapped around the key 20, as shown in phantom with the key removed in FIGURE 3. Obviously, as the strip end 20 is wrapped around the key, the tightness of the band will increase. When the desired tightness is achieved, the band may be locked in this desired tightened position, as shown in FIGURES 3 and 4, by rotating the key 22 in a counterclockwise direction while simultaneously rolling the key along the curved edges of the flanges 14 and 16 to substantially the diametrically opposite side of these flanges. Such counterclockwise rotation will cause the strip 12 to be folded back on itself along slot 18, after which the key may be removed since the fold in the strip will prevent loosening of the band.

It will be obvious to those skilled in the art that my clamp, by virtue of its relative simplicity and universal application to various diameter telescoped mating members, has many advantages and applications in many fields. For example, in an emergency, if a key were not available, a cotter pin could be utilized in place thereof to tighten and lock a clamp of the type described. Furthermore, as previously stated, insofar as service stations are concerned, only one clamp strip size need be stocked for various diameter applications. If the strip is unduly long for a given diameter, the excess may be cut off before winding.

Although this invention has been described in connection with a specific embodiment, various changes may be made in the form, structure, and arrangement of parts without departing from the spirit of the invention. Accordingly, I do not desire to be limited to the specific embodiment disclosed herein, but instead desire protection falling within the scope of the appended claim.

Having thus described the various features of this invention, what I claim is new and desire to secure by Letters Patent is:

A method of attaching a resilient tubular member to a mating telescope member through means of a single piece band type clamp formed from a metal strip having oppositely disposed perpendicularly extending curved flanges located at one end thereof and a slot located between said flanges comprising the steps of wrapping said strip around said telescoped members, inserting the other end of said strip through said slot, attaching a key to the inserted end of said strip, tightening said strip around said telescoped members by rotating the key in one direction while it bears against one side of said curved flanges so that the inserted end will be wrapped around said key, and locking said strip in the desired tightened position by rotating said key in the opposite direction while simultaneously rolling the key along the curved edges of the flanges to substantially the diametrically opposite side of said flanges so as to fold said strip back on itself along said slot.

References Cited by the Examiner
UNITED STATES PATENTS

| | | | |
|---|---|---|---|
| 484,298 | 10/92 | Chadbourne et al. | 81—9.3 |
| 1,698,813 | 1/29 | Gouirand | 24—269 |
| 1,963,436 | 6/34 | Dumke | 24—269 |
| 2,751,236 | 6/56 | Wyatt. | |

FOREIGN PATENTS

| | | |
|---|---|---|
| 581,447 | 4/31 | France. |
| 402,578 | 9/24 | Germany. |

DONLEY J. STOCKING, *Primary Examiner.*